United States Patent Office 2,798,406
Patented July 9, 1957

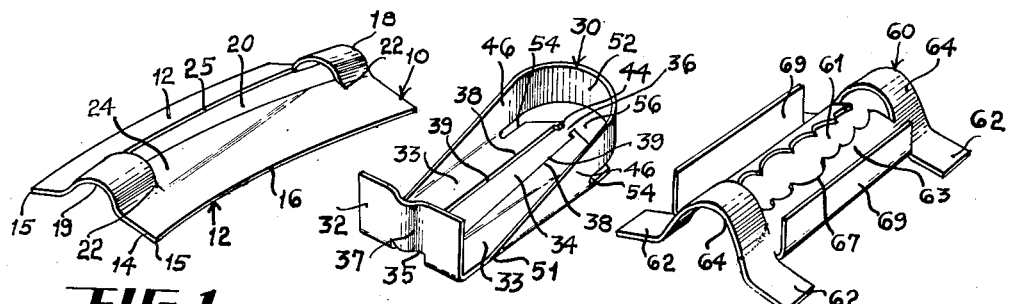

2,798,406

SLIDE FASTENER HAVING RESILIENTLY CONNECTED BASE PORTIONS

George L. Steck, Dayton, Ohio

Application February 17, 1954, Serial No. 410,917

4 Claims. (Cl. 85—36)

This invention relates to a slide fastener and more particularly to a retaining device for use wherever an element provided with studs is to be attached to metal parts.

In repairing of automobile bodies or in the attachment of name plates, ornaments and like articles, various problems arise. The studs are of varying sizes and various sizes of clamps or nuts have to be stocked.

Reference is made to my copending application, Serial No. 315,058, filed October 16, 1952, for Clamp.

When plates need replacing and it becomes necessary to unfasten a clamp or nut, it is common experience that where rusting and wear has occurred, it is extremely difficult and sometimes impossible to remove them without simply breaking them off. Furthermore, many of the snap-on nuts or clamps are so designed that removal is impossible without ruining the nut or clamp. In this process, damage may occur not only to the stud and nut; but also to surrounding parts as well.

Nut and bolt fasteners including slide fasteners, when used on automobiles and like places, are subjected to continuous jolting and vibration and under these conditions will not hold fast, but will vibrate or slide loose.

One object of the present invention is the provision of a sliding fastener which will adapt itself to various sizes and shapes of studs.

A further object of the invention is the provision of a slide fastener which is very easily adjusted without the use of tools, provides a secure fastening which does not wear loose in use even under conditions of continued vibration and which can be easily removed when desired, leaving all parts undamaged.

A further object of the invention is the provision of a slide fastener which operates under spring tension to grip a stud, the tension grip being tightened or released as the fastener is slid laterally in one direction or the other.

A further object of the invention is the provision of a slide fastener which is placed under tension as it is adjusted, biting into the metal of the stud and also at points into the metal of the plate to which the name or other plate is attached.

A further object of the invention is the provision of a slide fastener which can be used with ordinary T bolts, with or without screw threads.

A further object of the invention lies in the elimination of screw nuts and washers.

Other objects and advantages reside in the construction of parts, the combination thereof and the mode of operation, as will become more apparent from the following description.

In the drawing:

Figure 1 is a perspective view of the preferred embodiment of the slide fastener.

Figure 2 is a top plan view thereof.

Figure 3 is a cross sectional view taken substantially on the line 3—3 of Figure 2.

Figure 4 is a side elevational view showing the slide fastener slipped on over a stud and in place, either to be taken off or slid sidewise and tightened into place.

Figure 5 shows the fastener in tightened position.

Figure 6 is a perspective view of a modification.

Figure 7 is a top plan view of the modification shown in Figure 6.

Figure 8 is a cross sectional view taken substantially on the line 8—8 of Figure 7.

Figure 9 is another modification.

Figure 10 is a perspective view of a tool for use in applying and removing the snap-on fastener shown in Figure 9.

Figure 11 is a top plan of this modification.

Figure 12 is a cross sectional view, taken substantially on the line 12—12 of Figure 11.

Referring more in detail to the drawing, a slide fastener body 10 is made by die stamping, punch pressing and the like to a desired shape and subsequently hardened by heat treating. One such form is shown at 10 in Figure 1.

The slide fastener of Figure 1 comprises a body stamped to provide a pair of spring wing portions 12 which extend throughout the horizontal length of the body. These wing portions are curved slightly downwardly and laterally, as shown at 14 and are curved slightly upwardly toward their longitudinal mid-portion as shown at 16, as viewed in Figures 1, 4 and 5. As may be clearly seen in Figure 4, the under side of the slide fastener is concave, so that before pressure is exerted, the slide fastener is supported by the ends when placed upon the flat surface. The lateral mid-portion has arched or crimped portions 18 and 19, one at each end. A longitudinally extending cut-out slot 20 extends between the curved portions 18 and 19. The slot 20 is comparatively wide at its section adjacent the arched portion 18, and narrows or tapers as it approaches and terminates at the arched portion 19. At both ends the metal is cut to form a pair of lateral slashes 22 which are continuations of the slot 20 and make possible the upward bending of a pair of spring flanges 24. By providing slashes adjacent both ends of the slot, the portions between the slashes may then be flexed. These flanges may be triangular in shape progressing from comparatively wide at the slash 22 to substantially a point adjacent the opposite end. The wedges of the flanges adjacent the slot form cutting edges 25. The corners 15 form cutting points. As may be clearly seen in Figure 4, the cutting edges 25 are inclined upwardly from the wide end of the slot 20 to the narrow end.

A name plate or other article 40, to be fastened to a metal or other plate 50, is provided with a stud 42. This stud may be of variable size.

The stud 42 of the name plate 40 is inserted through openings in a metal plate 50, to which it is to be attached. The slide fastener 10 is then slipped over it at the wide portion of the slot 20, as shown in dotted line in Figure 2. Then the fastener is slid longitudinally in the direction indicated by the arrow A in Figure 4. The stud is pressed farther into the slot to a position such as is shown in Figures 3 and 5. The concave under side of the slide fastener is then flattened somewhat, as clearly seen by comparing Figures 4 and 5.

As the stud 42 proceeds down the length of the slot 20, the hard cutting edges 25 of the slot 20 first grip and then cut into the softer metal of the stud 42. As it proceeds farther down the length of the slot, the pressure of the stud 42 on the edges of the narrowing slot 20 causes flattening of the body of the fastener in both lateral and longitudinal directions. This is shown in Figures 3 and 5. A tense tight spring is formed, the pressures of which are exerted upon the flanges to tighten their grip upon the stud. Any upward movement of the fastener itself only increases its hold on the stud. The corners 15 embed and anchor themselves into the surface of the metal plate 50, thus resisting any tendency toward backward movement brought about by vibration, jarring, or other causes. The body 10 retains the stud in position, in that it exerts a spring tension, always pressing the article 40 against the surface of member 50.

It will be seen that the only release possible, short of failure or breaking of parts, is lateral movement of the fastener in the reverse direction. This can be accomplished easily when release is desired; but, due to the construction of the device, does not occur accidentally.

In the modification shown in Figures 6, 7 and 8, the body of the fastener 30 is formed at both ends to provide upturned flanges 32 and 52. Each of these flanges has its peculiar function in allowing expansion of the slot 34. Each also adds to ease in manipulation. The end flange 32 is bent at a substantial right angle to the horizontal wing portions 33. A slot 34 is graduated in width from a comparatively wide end 35, which is initiated at a point adjacent the end flange 32, to a narrowed end 36. The slot allows crimping at 37 of the end flange 32, and the crimped portion, when placed under tension, allows widening of the slot 34. A pair of flanges 38 are bent upwardly and have cutting edges 39. Stops 44 are provided in the slot 34.

The longitudinal edges of the fastener are bent right angularly to the horizontal and form flanges 46 which are graduated in width from 0, at 51, widening toward the rear end and merging into the curved or crimped end flange 52.

An undercut 54 is made where flanges 38 meet flanges 46. A completely cut-out portion 56 is a continuation of the slot 34 and provides spring action of the device.

The action of this modification is similar to that of Figure 1. When the stud 42 is inserted in the wide end of the slot 34, and the stud travels toward the narrowed end, the whole device is placed under spring tension. The cutting edges 39 first contact, then grip and then bite into the softer metal of the stud 42 and as the fastener travels so as to advance the stud 42 towards the narrowed end of the slot 34, the flanges 38 flex downwardly and flatten. Crimped portions 37 and 52 flatten and become activated springs to tighten the bite of the flange edges on the stud.

In the same manner as above noted in connection with Figures 1 to 5 inclusive, all tensions increase the hold of the fastener on the stud, and its accidental release is impossible. Planned release is effected easily by lateral sliding. The end flanges in this modification serve as means for facilitating handling. The tool shown in Figure 10 can be used. Furthermore, the fastener may be removed by tapping the end flange 32 or by pushing the flange 32 to clear the pin 42.

The modification shown in Figure 9 shows a snap-on fastener. A body portion 60 is stamped into the configuration there shown. Each end is provided with a pair of downwardly curved wing portions 62 and an upwardly crimped portion or end 64. A pair of upwardly and inwardly curved flanges 63 lies intermediate the ends of the body portion 60. Their inwardly directed edges form the opposing edges of the slot 61 and are formed in oppositely disposed corresponding arcs 67 which become smaller and are placed closer together as the slot approaches either end from its mid section. The oppositely positioned arcs are complementary and a series of pairs of arcs of varying sizes is thus provided for receiving varying sizes of studs. The points of convergence of the arcs form teeth 68 for gripping and biting into the studs 42.

A pair of upwardly directed flanges 69 is formed at the lateral edges of the body 60, and midway of its ends.

An implement may be used for placing the device upon a stud 42.

A pair of spring pliers 70 is shown in Figure 10. A compression spring 72 is located between the handles 74, on the opposite side of the double pivot 76 from the jaws 78. The spring 72 forces the handles 74 apart, so that the jaws 78, when at rest, are in contact with one another.

This tool is used with the modification shown in Figure 9. The handles of the pliers are grasped with the hand, and the jaws 78 placed between the flanges 69. When the handles are pressed inwardly, the jaws are opened and contact the flanges 69. Further pressure flexes all areas of the body 60. The crimped ends 64, as well as the flanges 63, are flattened and become springs. The edges of the slot 61 are pressed apart sufficiently to receive a stud or pin 42 at the position where the complementary arcs are adapted to its size. When the pressure of the pliers is released, the arc edges and the adjacent teeth spring onto and grip the stud.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A removably mountable sheet metal slide fastener for fastening a stud to a plate, said fastener comprising a body, a pair of spring flanges having sharp edges and forming a slot graduated in width from one end to the other whereby one end is wide and the other end is narrow, said slot being positioned centrally and longitudinally on said body, the margins of the flanges having sharp edges and being outwardly inclined from said body from the wide end of the slot to the narrow end thereof so as to occupy a plane inclined to said body, said body including lateral flanges extending longitudinally with respect to said slot and along the lateral margins of the spring flanges, said lateral flanges being arched slightly upwardly toward their mid-portions and downwardly at their ends to form sharp downwardly pointed corners, arched portions on the ends of said body spanning said slot, said arched portions being disposed in longitudinally spaced relation with said slot extending therebetween, said slide fastener, upon being positioned upon a stud located in the wide end of said slot and between said arched portions, being adapted to slide laterally enabling advancement of the narrow end of said slot toward said stud whereby the inclined flanges of said slide fastener are brought into compressive engagement with said stud, said inclined flanges cooperating with said stud in response to lateral movement of said slide fastener to wedge the downwardly pointed corners of said slide fastener against said plate so as to embed said corners into the plate thereby anchoring the slide fastener to the plate.

2. A removably mountable sheet metal slide fastener according to claim 1, wherein the spring flanges are substantially triangular.

3. A removably mountable sheet metal slide fastener for engaging a stud projecting through an opening in a plate, said slide fastener comprising a main body, said main body including a pair of spring flanges provided with sharp edges and forming a slot graduated in width from one end to the other whereby one end is wide and the other end is narrow, said slot being positioned centrally and longitudinally of said main body, the margins of the flanges being inclined outwardly from the wide end of the slot to the narrow end thereof, so that the free margins of the flanges are further removed from the main body at the narrow end of the slot than at the wide end thereof, said main body including lateral flanges extending longitudinally along the lateral edges thereof, said body including arched portions spanning only the ends of the main body and beyond the ends of the slot the arched portion across the wide end of the slot being of less extent than the arched portion across narrow end of the slot, said arched portions being substantially perpendicular to the lateral flanges and permitting slight spreading of the slot, said slide fastener upon being positioned upon a stud located in the wide end of the slot between said arched portions being adapted to slide laterally enabling advancement of the narrow end of said slot toward said stud whereby the inclined margins of the spring flanges are brought into compressive engagement with said stud, said inclined flanges cooperating with said stud in response to lateral movement of said slide fastener to wedge the body of the slide fastener against the metal plate.

4. A removably mountable sheet metal slide fastener according to claim 3, wherein the free margins of the spring flanges are provided with projections at the narrow end of the slot, which projections are directed into the slot.

References Cited in the file of this patent

UNITED STATES PATENTS

| | | |
|---|---|---|
| 1,793,127 | Osius | Feb. 17, 1931 |
| 2,266,049 | Kost | Dec. 16, 1941 |
| 2,285,273 | Hall et al. | June 2, 1942 |
| 2,373,312 | Hughes | Apr. 10, 1945 |
| 2,574,107 | Joy | Nov. 6, 1951 |